(12) United States Patent
Alvarado

(10) Patent No.: US 8,182,013 B1
(45) Date of Patent: May 22, 2012

(54) TAILGATE LADDER ASSEMBLY

(76) Inventor: Rodolfo H. Alvarado, San Antonio, TX (US)

( * ) Notice: Subject to any disclaimer, the term of this patent is extended or adjusted under 35 U.S.C. 154(b) by 141 days.

(21) Appl. No.: 12/780,134

(22) Filed: May 14, 2010

(51) Int. Cl.
*B62D 33/03* (2006.01)
(52) U.S. Cl. ............................ 296/62; 182/127; 280/163
(58) Field of Classification Search ............... 182/127; 280/163, 164.1, 164.2, 166; 296/50, 55, 296/57.1, 62
See application file for complete search history.

(56) References Cited

U.S. PATENT DOCUMENTS

| | | | |
|---|---|---|---|
| 4,180,143 A | 12/1979 | Clugston | |
| 4,639,032 A * | 1/1987 | Barbour | 296/62 |
| 4,757,876 A | 7/1988 | Peacock | |
| 5,028,063 A | 7/1991 | Andrews | |
| D330,535 S | 10/1992 | Albertson | |
| 5,205,603 A * | 4/1993 | Burdette, Jr. | 296/62 |
| 5,687,813 A * | 11/1997 | Bensch | 182/127 |
| 6,422,342 B1 | 7/2002 | Armstrong et al. | |
| 6,857,680 B2 | 2/2005 | Fielding | |
| 6,966,597 B2 | 11/2005 | Tegtmeier | |
| 7,261,357 B1 * | 8/2007 | Bechen | 296/62 |
| 7,441,820 B1 * | 10/2008 | Alvarado | 296/62 |
| 7,896,419 B2 * | 3/2011 | Elliott et al. | 296/62 |
| 2004/0113450 A1 | 6/2004 | Fielding | |
| 2009/0072571 A1 * | 3/2009 | Elliott et al. | 296/62 |

* cited by examiner

*Primary Examiner* — Dennis H. Pedder
*Assistant Examiner* — Jason S Daniels

(57) ABSTRACT

A tailgate ladder assembly includes a pickup bed having a tailgate hingedly coupled thereto. A housing includes a bottom wall, a top wall and a pair of side walls. The bottom wall is attached to the tailgate and has an open end facing away from the bed. A pair of guides is slidably mounted within the housing and each abuts one of the side walls. Each of the guides has a first end that is extendable outwardly of the front end in a deployed position. A bottom ladder includes a pair of legs and a plurality of steps attached to and extending between the legs. Pivot rods extend through the legs and the guides to pivotally couple the bottom ladder to the guides. The bottom ladder is pivotable to be extendable into the housing or to extend downwardly from the tailgate.

7 Claims, 6 Drawing Sheets

US 8,182,013 B1

TAILGATE LADDER ASSEMBLY

BACKGROUND OF THE DISCLOSURE

Field of the Disclosure

The disclosure relates to tailgate mountable ladder devices and more particularly pertains to a new tailgate mountable ladder device for assisting a person in entering and leaving the bed of a pick-up truck.

SUMMARY OF THE DISCLOSURE

An embodiment of the disclosure meets the needs presented above by generally comprising a pickup bed having a tailgate hingedly coupled to the pickup bed adjacent to an end edge of the pickup bed. The tailgate has an inner surface and a distal edge with respect to the end edge. A housing includes a bottom wall, a top wall and a pair of side walls attached to and extending between the top and bottom walls. The bottom wall is attached to the inner surface adjacent to the distal edge and an open front end of the housing facing toward the distal edge. A pair of guides is provided. Each of the guides has a first end and a second end. Each of the guides is slidably positioned within the housing. Each of said side walls is abutted by one of the guides. The first ends are extendable outwardly of the front end in a deployed position or are positionable within the housing in a stored position. A bottom ladder includes a pair of legs and a plurality of steps attached to and extending between the legs. Each of the legs has one of a pair of pivot rods extending therethrough. Each of the guides has one of the pivot rods extending therethrough to pivotally couple the bottom ladder to the guides. The bottom ladder is pivotable into a plane orientated parallel to the bottom wall to allow the bottom ladder to be slid into the housing. The bottom ladder is removable from the housing and pivotable into a plane orientated perpendicular to the bottom wall and extending downwardly from the tailgate when the tailgate is horizontally orientated.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
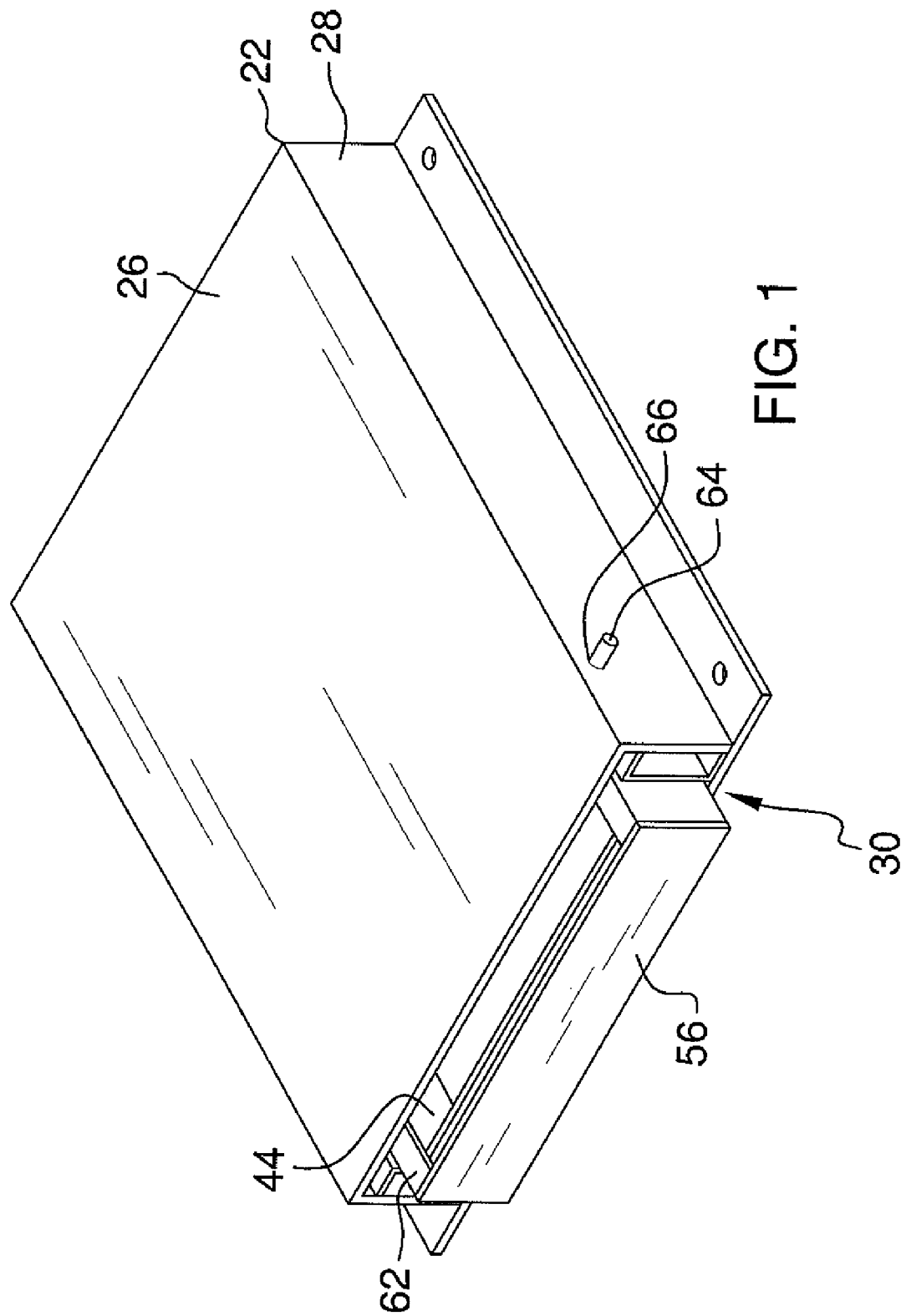
FIG. 1 is a perspective view of a tailgate ladder assembly according to an embodiment of the disclosure.
Figure 2:
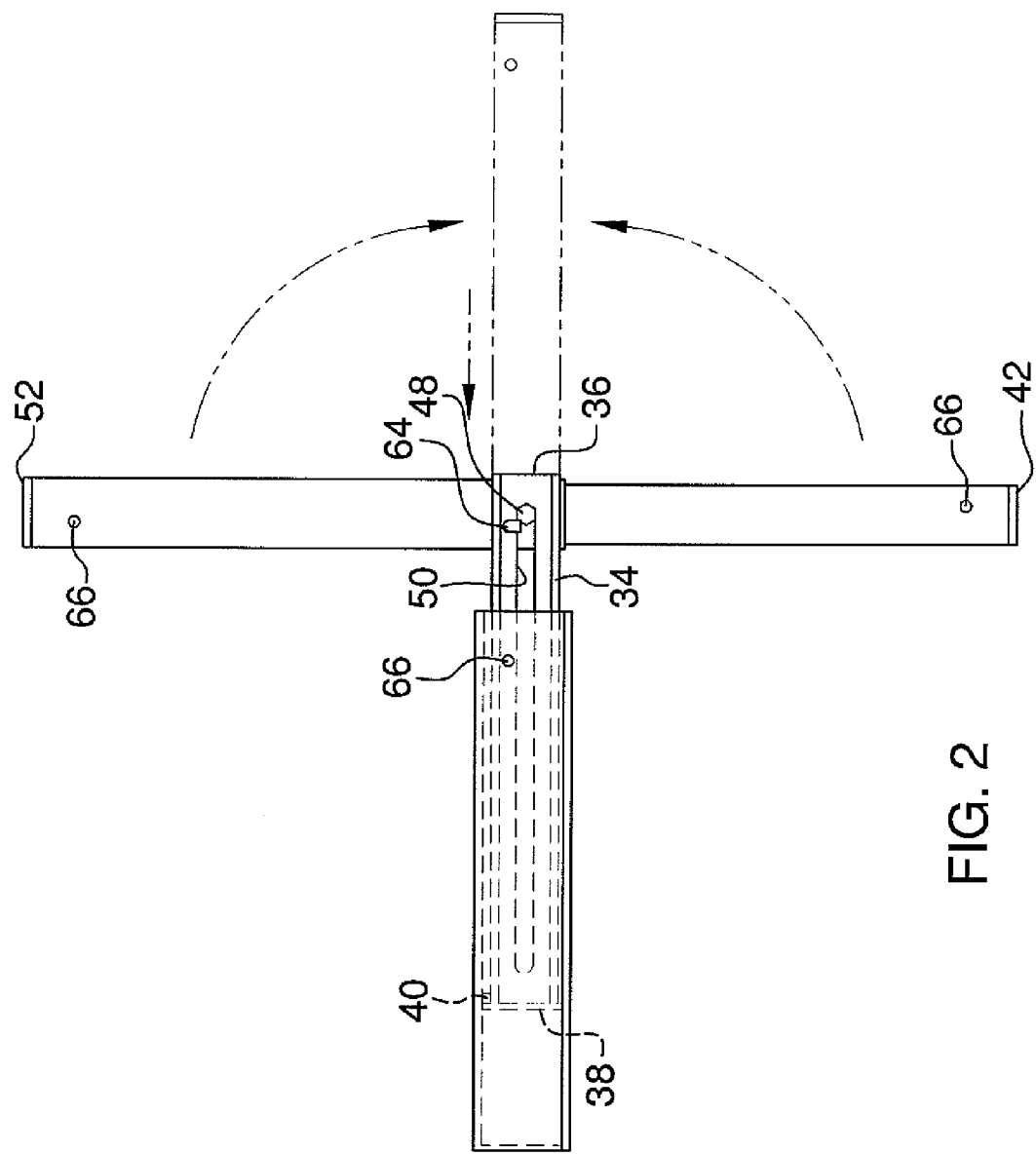
FIG. 2 is a side view of an embodiment of the disclosure.
Figure 3:
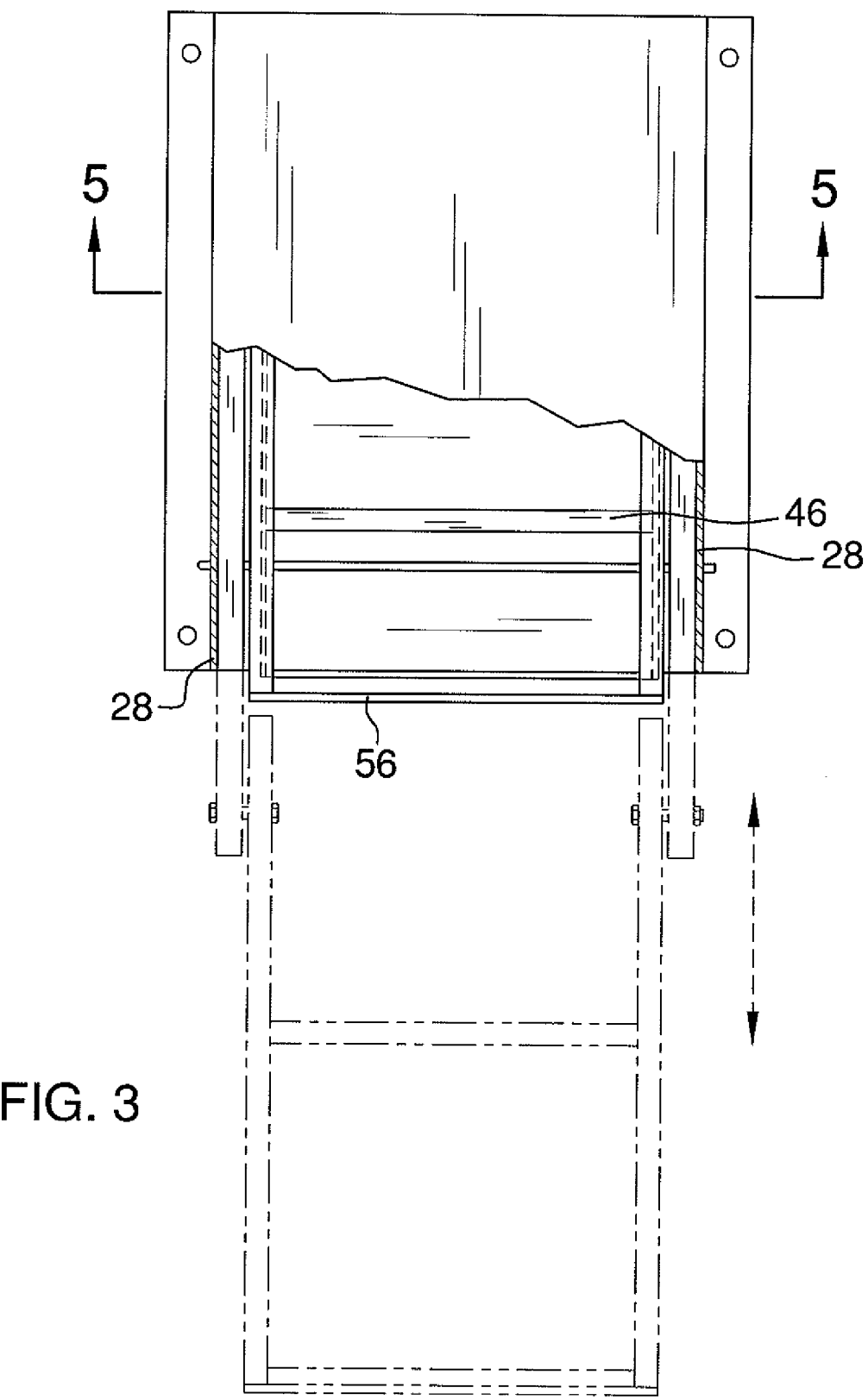
FIG. 3 is a top broken view of an embodiment of the disclosure.
Figure 4:
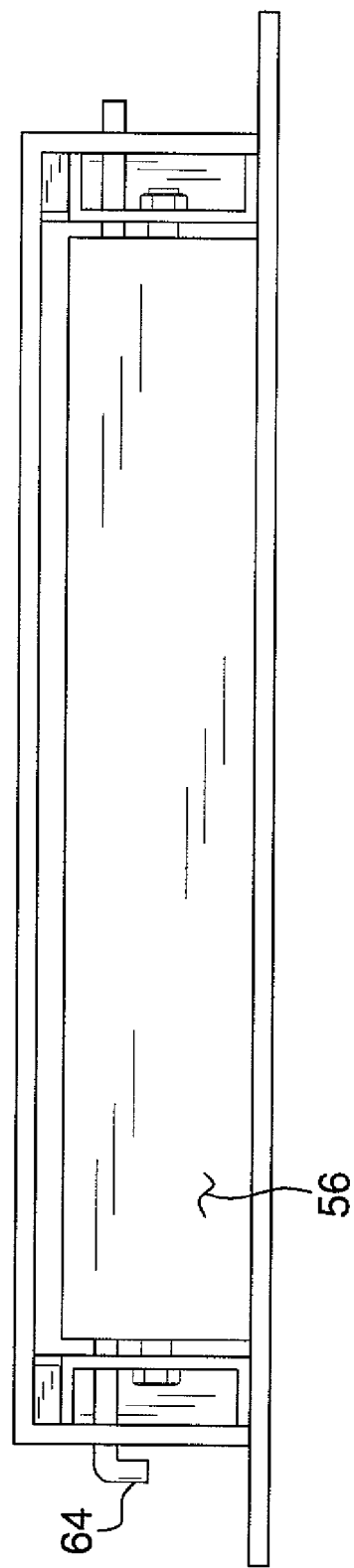
FIG. 4 is a front view of an embodiment of the disclosure.
Figure 5:
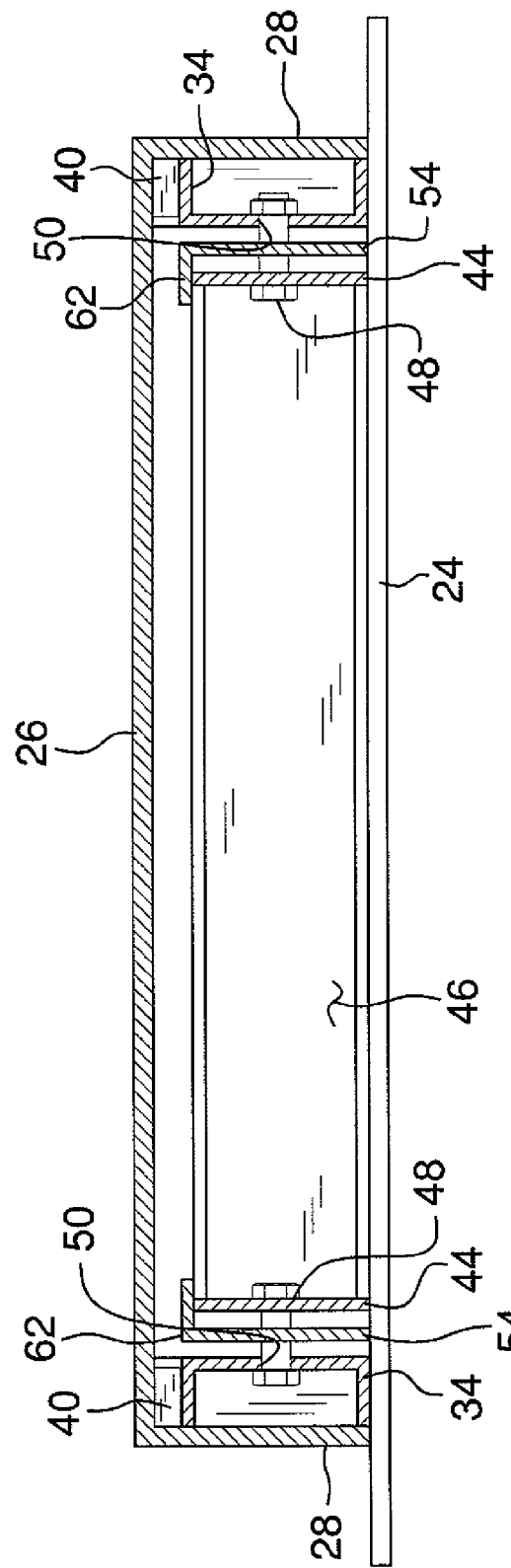
FIG. 5 is a cross-sectional view of an embodiment of the disclosure taken along line 5-5 of FIG. 3.
Figure 6:
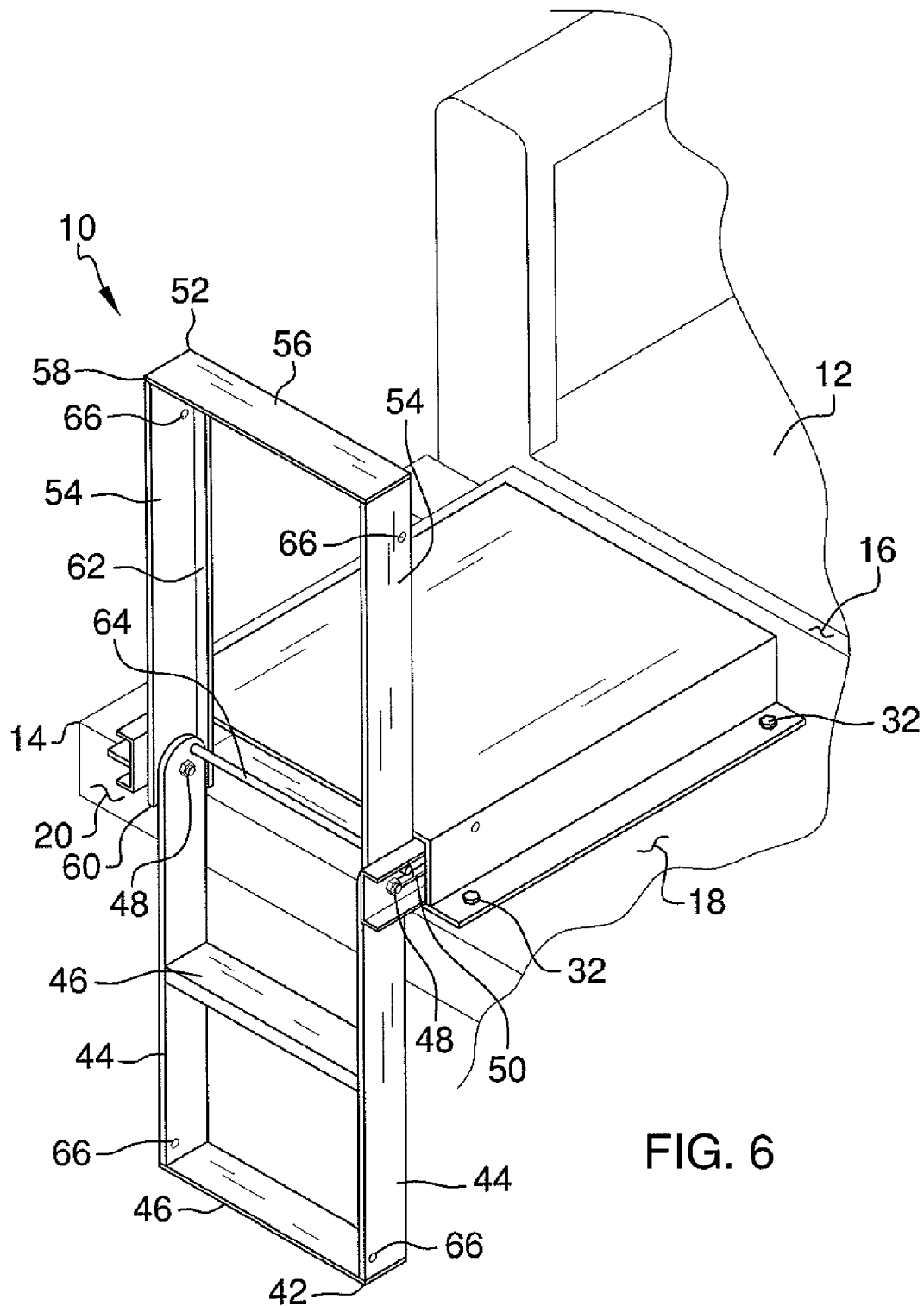
FIG. 6 is a perspective deployed view of an embodiment of the disclosure.

With reference now to the drawings, and in particular to FIGS. 1 through 6 thereof, a new tailgate mountable ladder device embodying the principles and concepts of an embodiment of the disclosure and generally designated by the reference numeral 10 will be described.

As best illustrated in FIGS. 1 through 6, the tailgate ladder assembly 10 generally comprises a conventional pickup bed 12 that has a tailgate 14 hingedly coupled to the pickup bed 12 adjacent to an end edge 16 of the pickup bed 12. The tailgate 14 has an inner surface 18 and a distal edge 20 with respect to the end edge 16. A housing 22 includes a bottom wall 24, a top wall 26 and a pair of side walls 28 attached to and extending between the top 26 and bottom 24 walls. The bottom wall 24 is attached to the inner surface 18 adjacent to the distal edge 20 and an open front end 30 of the housing 22 faces toward the distal edge 20. The bottom wall 24 may extend outwardly, laterally, from the side walls 28 to receive fasteners 32 that can be extended into the tailgate 14 for easier mounting of the housing 22 on the tailgate 14.

A pair of guides 34 is provided. Each of the guides 34 has a first end 36 and a second end 38. Each of the guides 34 is slidably positioned within the housing 22 to allow the first ends 36 to be extended outwardly of the front end 30 in a deployed position or be positioned within the housing 22 in a stored position. Each of the side walls 28 abuts one of the guides 34. The housing 22 may have at least one stop 40 or a pair of stops 40 therein. Each of the guides 34 abuts one of the stops 40 in the deployed position to prevent the guides 34 from being fully extended outwardly of the housing 22.

A bottom ladder 42 includes a pair of legs 44 and a plurality of steps 46 is attached to and extending between the legs 44. A pair of pivot rods 48 is provided. Each of the legs 44 has one of the pivot rods 48 extending therethrough. Each of the guides 34 has one of the pivot rods 48 extending therethrough to pivotally couple the bottom ladder 42 to the guides 34. The guides 34 each have elongated slots 50 therein extending along lines extending through associated ones of the first 36 and second 38 ends. The pivot rods 48 are mounted in the slots 50. The bottom ladder 42 is pivotable into a plane orientated parallel to the bottom wall 24 to allow the bottom ladder 42 to be slid into the housing 22 as the pivot rods 48 slide along the slots 50. The bottom ladder 42 is removable from the housing 22 and pivotable into a plane orientated perpendicular to the bottom wall 24 and extending downwardly from the tailgate 14 when the tailgate 14 is horizontally orientated.

A top ladder 52 includes a pair of lateral supports 54 and a grip 56 that is attached to and extends between the lateral supports 54. Each of the lateral supports 54 has a top end 58 and a bottom end 60 when the top ladder 52 is vertically orientated. Each of the lateral supports 54 has one of the pivot rods 48 coupled thereto to pivotally couple the top ladder 52 to the bottom ladder 42. The pivot rods 48 are positioned adjacent to the bottom ends 60. Each of the lateral supports 54 is positioned between one of the guides 34 and one of the legs 44 to allow the bottom ladder 42 to be pivoted into a mated position 52 defined as the bottom ladder 42 being bounded by the lateral supports 54, the grip 56 and the housing 22. The top 52 and bottom 42 ladders are slidable into the housing 22 when the bottom 42 and top 52 ladders are in the mated position. The top ladder 52 is pivotable into a vertical orientation when the bottom ladder 42 is vertically orientated.

A pair of flanges 62 may be provided as well. Each of the lateral supports 54 has one of the flanges 62 attached thereto. The flanges 62 abut the bottom ladder 42 when the top 52 and bottom 42 ladders are in the mated position. The flanges 62 are positioned so that they are positioned over the bottom ladder 42 when the top 52 and bottom 42 ladders are mated to prevent the top ladder 52 from pivoting below the bottom ladder 42 when the bottom ladder 42 is in a horizontal orientation.

A locking pin 64 is extendable through the top ladder 52, bottom ladder 42 and the guides 34 when the top 52 and bottom 42 ladders are vertically orientated to releasably retain the top 52 and bottom 42 ladders in a vertical orientated position. The locking pin 64 is removed from the top 52 and bottom 42 ladders when they are placed in the mating position and then can be slid through locking apertures 66 in the housing 22 and the top 52 and bottom 42 ladders to retain them within the housing 22.

In use, the top 52 and bottom 42 ladders are retained in a stored position within the housing 22 until it is needed. When the tailgate 14 is lowered, the locking pin 64 is removed and the top 52 and bottom 42 ladders slid out of the housing 22. They are pivoted with respect to each other as stated above and as shown in the Figures to form a vertically orientated ladder that will assist a person in entering and leaving the bed 12 of a pickup truck.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A tailgate ladder system comprising:
    a pickup bed having a tailgate hingedly coupled to said pickup bed adjacent to an end edge of said pickup bed, said tailgate having an inner surface and a distal edge with respect to said end edge;
    a housing including a bottom wall, a top wall and a pair of side walls being attached to and extending between said top and bottom walls, said bottom wall being attached to said inner surface adjacent to said distal edge and an open front end of said housing facing toward said distal edge;
    a pair of guides, each of said guides having a first end and a second end, each of said guides being slidably positioned within said housing, each of said side walls being abutted by one of said guides, said first ends being extendable outwardly of said front end in a deployed position or positionable within said housing in a stored position;
    a bottom ladder including a pair of legs and a plurality of steps being attached to and extending between said legs;
    a pair of pivot rods, each of said legs having one of said pivot rods extending therethrough, each of said guides having one of said pivot rods extending therethrough to pivotally couple said bottom ladder to said guides, said bottom ladder being pivotable into a plane orientated parallel to said bottom wall to allow said bottom ladder to be slid into said housing, said bottom ladder being removable from said housing and pivotable into a plane orientated perpendicular to said bottom wall and extending downwardly from said tailgate when said tailgate is horizontally orientated; and
    a top ladder including a pair of lateral supports and a grip being attached to and extending between said lateral supports, each of said lateral supports having a top end and a bottom end when said top ladder is vertically orientated, each of said lateral supports having one of said pivot rods coupled thereto to pivotally couple said top ladder to said bottom ladder, said pivot rods being positioned adjacent to said bottom ends, said top ladder being pivotable into a vertical orientation when said bottom ladder is vertically orientated.

2. The system according to claim 1, wherein said housing has at least one stop therein abutting at least one of said guides when said guides are in said deployed position to prevent said guides from being fully extended outwardly of said housing.

3. The system according to claim 1, wherein said guides each have elongated slots therein extending along lines extending through associated ones of said first and second ends, said pivot rods being mounted in said slots, said bottom ladder being slidable into said housing as said pivot rods slide along said slots.

4. The system according to claim 1, wherein each of said lateral supports is positioned between one of said guides and one of said legs to allow said bottom ladder to be pivoted into a mated position defined as said bottom ladder being bounded by said lateral supports, said grip and said housing, said top and bottom ladders being slidable into said housing when said bottom and top ladders are in said mated position.

5. The system according to claim 4, further including a pair of flanges, each of said lateral supports having one of said flanges attached thereto, said flanges abutting said bottom ladder when said top and bottom ladders are in said mated position.

6. The system according to claim 1, further including a locking pin being extendable through said top ladder, bottom ladder and said guides when said top and bottom ladders are vertically orientated to releasably retain said top and bottom ladders in a vertical orientated position.

7. A tailgate ladder system comprising:
    a pickup bed having a tailgate hingedly coupled to said pickup bed adjacent to an end edge of said pickup bed, said tailgate having an inner surface and a distal edge with respect to said end edge;
    a housing including a bottom wall, a top wall and a pair of side walls being attached to and extending between said top and bottom walls, said bottom wall being attached to said inner surface adjacent to said distal edge and an open front end of said housing facing toward said distal edge;
    a pair of guides, each of said guides having a first end and a second end, each of said guides being slidably positioned within said housing, each of said side walls being abutted by one of said guides, said first ends being extendable outwardly of said front end in a deployed position or positionable within said housing in a stored position, said housing having a pair of stops therein, each of said guides abutting one of said stops in said deployed position to prevent said guides from being fully extended outwardly of said housing;
    a bottom ladder including a pair of legs and a plurality of steps being attached to and extending between said legs;

a pair of pivot rods, each of said legs having one of said pivot rods extending therethrough, each of said guides having one of said pivot rods extending therethrough to pivotally couple said bottom ladder to said guides, said guides each having elongated slots therein extending along lines extending through associated ones of said first and second ends, said pivot rods being mounted in said slots, said bottom ladder being pivotable into a plane orientated parallel to said bottom wall to allow said bottom ladder to be slid into said housing as said pivot rods slide along said slots, said bottom ladder being removable from said housing and pivotable into a plane orientated perpendicular to said bottom wall and extending downwardly from said tailgate when said tailgate is horizontally orientated;

a top ladder including a pair of lateral supports and a grip being attached to and extending between said lateral supports, each of said lateral supports having a top end and a bottom end when said top ladder is vertically orientated, each of said lateral supports having one of said pivot rods coupled thereto to pivotally couple said top ladder to said bottom ladder, said pivot rods being positioned adjacent to said bottom ends, each of said lateral supports being positioned between one of said guides and one of said legs to allow said bottom ladder to be pivoted into a mated position defined as said bottom ladder being bounded by said lateral supports, said grip and said housing, said top and bottom ladders being slidable into said housing when said bottom and top ladders are in said mated position, said top ladder being pivotable into a vertical orientation when said bottom ladder is vertically orientated;

a pair of flanges, each of said lateral supports having one of said flanges attached thereto, said flanges abutting said bottom ladder when said top and bottom ladders are in said mated position; and a locking pin being extendable through said top ladder, bottom ladder and said guides when said top and bottom ladders are vertically orientated to releasably retain said top and bottom ladders in a vertical orientated position.

* * * * *